United States Patent Office

3,562,211
Patented Feb. 9, 1971

3,562,211
PLASTIC SURFACE COVERINGS OF IMPROVED
ULTRAVIOLET LIGHT STABILITY
Richard D. Cassar, West Chester, Pa., and Jackson S.
Boyer, Northridge, Del., assignors to Sun Oil Company, Philadelphia, Pa., a corporation of New Jersey
No Drawing. Filed Mar. 10, 1969, Ser. No. 805,872
Int. Cl. C08f 45/58
U.S. Cl. 260—45.85
14 Claims

ABSTRACT OF THE DISCLOSURE

Plastic surface covering compositions having improved ultraviolet stability comprising a plasticized solid vinyl chloride polymer resin containing an ultraviolet stability improving quantity of a polyester of a polymethylated muconic acid selected from the group consisting of the cis-cis, cis-trans, or trans-trans isomers of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and mixtures thereof with a polyethylene glycol of a molecular weight in the range of 100 to 1000, said polyester having a molecular weight in the range of 600 to 20,000.

CROSS REFERENCES TO RELATED APPLICATIONS

The present application is related to copending U.S. patent applications Ser. Nos. 691,129 of Jackson S. Boyer and Richard D. Cassar filed Dec. 18, 1967 entitled "Alpha-Olefin Polymers Having Improved Ultraviolet Stability" now U.S. Pat. No. 3,511,806; 691,153 of Jackson S. Boyer and Richard D. Cassar filed Dec. 18, 1967 entitled "Ultraviolet Stabilized Petroleum Hydrocarbons"; 691,199 of Jackson S. Boyer and Richard D. Cassar filed Dec. 18, 1967 entitled "Ultraviolet Stabilized Elastomeric Composition"; 758,574 of Jackson S. Boyer and Richard D. Cassar, filed Sept. 9, 1968 entitled "Polymethylated Muconic Acids for Elastomer Compositions"; 731,619 of Jackson S. Boyer and Richard D. Cassar filed May 23, 1968 entitled "Stabilized Latex Emulsions"; and 777,476 of Jackson S. Boyer and Richard D. Cassar filed Nov. 20, 1968 entitled "Plastic Surface Coverings of Improved Ultraviolet Stability," each of which discloses ultraviolet stability improved compositions containing polymethylated muconic acids and their hydrocarbyl esters. The present application is also related to applicants' copending U.S. applications Ser. No. 805,835 entitled "Alpha-Olefin Composition Containing Polyester Stabilizers," Ser. No. 805,871 entitled "Elastomeric Composition Containing Phosphite Ester and Polyester Stabilizers," Ser. No. 805,819 entitled "Petroleum Hydrocarbons Containing Polyester Stabilizers," and Ser. No. 805,874 entitled "Elastomer Compositions Containing Polyester Stabilizers," each of which is filed of even date herewith.

BACKGROUND OF THE INVENTION

Flexible plastic surface covering compositions in the form of sheets and tiles have been shown to be particularly useful as both decorative and protective coverings for floors and walls as well as other interior and external parts of private homes and commercial buildings. Also, the surfaces of transportation vehicles such as railroad passenger cars, automobile trailers, ships and airplanes have been enhanced by the addition of flexible plastic surface coverings.

In accordance with present commercial manufacturing procedures, flexible plastic surface coverings can be prepared in the form of an unsupported sheet or as a plastic surface wear layer on a felt backing impregnated with a waterproofing agent. These flexible plastic surface coverings normally contain thermoplastic synthetic resinous binders, plasticizers and pigments, as well as various other additives. Thermoplastic resins such as polyvinyl chloride and its copolymers, particularly vinyl chloride copolymerized with vinyl acetate are most commonly used in formulating the wear layer or surface layer composition used in production of such plastic surface coverings. The polymer is normally homogeneously blended with one or more plasticizers and other additives and the blend is subsequently applied to the surface of the backing material and fused. This procedure provides a surface covering composition having excellent wear properties, resistance to attack by ordinary household chemicals, and excellent clarity and brilliance of color. These assets combined with the relatively low cost of the vinyl chloride polymer resins render these compositions particularly suited for large scale commercial production.

In normal usage, these surface covering materials are often subject to long periods of exposure to sunlight and in many instances have been shown to be unstable when exposed to ultraviolet light. This ultraviolet instability often results in increased yellowness particularly in light colored or transparent compositions. Therefore, consideration must be given to improvement of the ultraviolet stability of the composition as a whole and particularly to the wear layer or surface layer. Light stabilizers such as resorcinol disalicylate, resorcinol dibenzoate, phenyl phthalate, phenyl benzoate, ortho-tolyl benzoate, eugenol, guaiacol, o-nitrophenol, o-nitroaniline, triethyleneguaiacol salicylate, and organic phosphates have been proposed in the past for use in surface covering compositions.

Copending U.S. patent application, Ser. No. 777,476 discloses that flexible plastic surface covering compositions containing plasticized vinyl chloride polymer can be improved by the addition of an ultraviolet stability improving quantity of polymethylated muconic acids and their $C_1$ to $C_{20}$ hydrocarbyl mono- and diesters. These ultraviolet stability improving additives are solids which are effective as disclosed. However, there are circumstances which occur in the preparation of plasticized vinyl chloride polymer compositions where a liquid stabilizer is desired. A new liquid composition suitable for use in improving the ultraviolet stability of plasticized vinyl chloride polymer compositions has now been discovered.

SUMMARY OF THE INVENTION

The present invention relates to flexible surface covering compositions containing a plasticized vinyl chloride polymer and having improved ultraviolet stability characteristics. More particularly, this invention relates to plasticized solid vinyl chloride polymer resin compositions containing a vinyl chloride polymer and an ultraviolet stability improving quantity of a polyester of a polymethylated muconic acid with polyethylene glycol.

DESCRIPTION

In accordance with present commercial manufacturing procedures, flexible plastic surface coverings can be made in the form of an unsupported sheet or as a surface wear layer on a felt backing impregnated with a waterproofing agent. One feature common to the surface covering materials, of the type herein disclosed, is that each has a flexible surface wear layer containing plasticized vinyl chloride polymer. The compositions of the present invention comprise plasticized vinyl chloride polymer resins. These compositions can be prepared in the form of a plastisol or organosol which is thereafter applied to a prepared backing sheet. A plastisol composition can also be extruded as an unsupported sheet. A plastisol can be generally defined as a thermoplastic resin uniformly dispersed in the form of fine particles in a liquid plasticizer. The composition can also contain processing binders which are also fusable thermoplastic resins, as well as pigments, fillers, stabilizer and release agents. Organosols are commonly defined as being similar to plastisols in composition with the exception that a volatile organic solvent is used as a diluent which provides for easier application of the composition to the surface of a backing sheet.

The physical characteristics as well as the attractive appearance of the flexible plastic surface covering materials are attributable primarily to those properties contributed by the principal binder of the wear layer composition. The resins most widely used as the principal binder in this type of composition are polyvinylchloride polymers. Copolymers of vinyl chloride and vinyl acetate which have specific viscosities above about 0.17, as determined in a solution containing 0.20 gram of resin per 100 milliliters of nitrobenzene at 20.0° C., containing about 90% to 97% by weight vinyl chloride and about 3 to 10 weight percent vinyl acetate are particularly suitable. Other monomers including dibutylmaleate, ethyl acrylate and methyl acrylate, butyl acrylate, methyl methacrylate, can be copolymerized with vinyl chloride. These copolymers preferably contain 90 to 97 weight percent combined vinyl chloride and have the same general viscosity range as disclosed for copolymers of vinyl chloride and vinyl acetate.

In addition, copolymers of vinyl chloride and acrylonitrile containing 45% to 80% of vinyl chloride can be used as well as certain copolymers of vinyl chloride and vinylidene chloride. All the vinyl resins mentioned above are substantially insoluble in toluene at 25° C.

The wear layer composition can also contain processing binders which include low molecular weight vinyl chloride copolymerized with vinyl acetate and also other copolymers including styrene-butadiene and styrene-acrylonitrile copolymers.

Plasticizers such as those conventionally used in the plastic surface covering art can be used in the compositions of the present invention. Generally, there must be sufficient plasticizer to ultimately plasticize the principal binder. Plasticizers used in the compositions of the present invention must have low vapor pressure at high temperatures required to fuse the principal binder. Plasticizers suitable for use in the compositions of the invention include dimethyl phthalate, dibutyl phthalate, diheptyl phthalate, dioctyl phthalate, dibutyl sebacate, dioctyl sebacate, dibenzyl sebacate, dibutyloxyethyl phthalate, dibutyloxy-guaiacol phthalate, octyl decyl adipate, didecyl adipate, triethylene glycol di-2-ethylbutyrate, trioctyl phosphate, tricresyl phosphate, tributyl phosphate, dipropylene glycol dibenzoate, phenyl phosphate, octyldiphenyl phosphate, dibutyl tartrate, amyl tartrate, butylbenzyl benzoate, triethylene glycol di-(2-ethyl-hexonate), diethylene glycol dipelargonate as well as combinations of these plasticizers have been successfully used.

Secondary plasticizers, which are less compatible with the principal binder can be used in combination with primary or solvent type plasticizers described above. The amount of secondary plasticizer used is limited by its degree of compatibility with the principal binder and the primary plasticizer used. Examples of suitable secondary plasticizers are alkyd derivatives of rosin, phenoxy ethyl oleates and laurates, chlorinated paraffin, aromatic hydrocarbon condensates, as well as many others known to those skilled in the art.

In certain procedures, the plasticized vinyl chloride polymer blend is first prepared in the form of small finely divided granules. In such a procedure, release additives are often a necessary part of the composition. These additives are generally wax substances which are fluid at temperatures above 300° F. Suitable waxy substances for use in accordance with this invention can include those materials of both synthetic and natural origin which are conventionally referred to as waxes, including such naturally-occurring waxes as vegetable waxes, carnauba wax, cottonseed wax, montan wax, candelilla wax, flax wax, seaweed wax and many others. Animal waxes such as beeswax, Chinese insect wax and spermaceti as well as petroleum waxes can be used. Synthetic waxes such as those prepared by polymerization of olefins including ethylene and propylene as well as Fischer-Tropsch waxes can also be used. The release additive is normally present in the composition in an amount sufficient to give good release of the composition from a hot plate when such a procedure is followed in preparation of the surface covering composition. Generally, about 0.2 to 2.5 weight percent release additive in the wear layer of the composition is sufficient. The preferred concentration of release agent in the composition is normally about 0.5 to 1.5 weight percent.

Backing compositions suitable for application of a flexible thermoplastic wear layer can be a sheet which becomes an intricate part of the surface covering composition or a backing which can be subsequently stripped away from the formed plastic wear layer surface covering composition. The conventional procedure is to use a fibrous backing sheet which becomes part of the vinyl surface covering product. Numerous fibrous materials can be used in the preparation of a fibrous backing sheet for use in accordance with the present invention. The fibrous material used is normally cellulose in origin although other fibers can be used including those of animal and mineral origin. The sources of cellulose can include cotton or other rag stock or wood pulp including both ground wood and chemical wood pulp, paper, boxes or mixtures thereof, in any proportions. In addition, fillers such as wood flour can be used.

In order that the fibrous sheet has sufficient strength for use as a surface covering material, it is conventionally impregnated with suitable saturants. Fibrous sheets impregnated with thermoplastic or elastomeric resins are particularly suitable for use as backing sheets. Suitable resins include vinyl resins such as polyvinyl chloride, polyvinyl acetate, polymerized vinylidene chloride, mixtures of these with other monomers and copolymers. Other polymers are suitable for use as impregnants of fibrous backing sheets include polymerized acrylic and methacrylic acids and their polymerized derivatives, polyethylene, polystyrene, butadiene-styrene copolymer, butadiene-acrylonitrile copolymer, natural rubber, polymerized chloroprene, and others. Polymers and copolymers of vinyl acetate are particularly suitable for this application. Fibrous sheets impregnated with these resins impart improved strength and flexibility to the final product and permit processing at a wide range of temperatures without excess bleeding of the resins. However, the backing sheet normally does not require ultraviolet stability. Therefore, no ultraviolet stability improving material is added to the backing sheet composition. The backing sheet materials can be prepared by any of the many standard procedures well known to those skilled in the art.

Backing sheets can be provided with a decorative coating which can be applied by rotogravure printing or by the addition of colored granules to the surface of the sheet which normally are adhered to the sheet by adhesives. This decorated sheet can thereafter be coated with the wear layer composition of the type hereinabove disclosed.

The ultraviolet stability improving additives found to be suitable for use in the compositions of the present invention are polyesters of polymethylated muconic acids selected from the group consisting of the cis-cis, cis-trans or trans-trans isomers of $\alpha,\alpha'$-dimethylmuconic acid, $\alpha,\beta'$-dimethylmuconic acid, $\alpha,\alpha,\beta'$-trimethylmuconic acid, $\alpha,\beta,\beta'$-trimethylmuconic acid and $\alpha,\alpha',\beta,\beta'$-tetramethylmuconic acid with a polyethylene glycol of molecular weight in the range of 100 to 1000. The polyesters are characterized as being normally liquid at room temperature and having a molecular weight in the range of 600 to 20,000. The ultraviolet stability improving additive is preferably present in the wear layer compositions of the present invention in the quantity of 0.1 to 20.0 weight percent based on the weight of the whole wear layer composition. The more preferred concentration of ultraviolet stability improving additive is 2.0 to 10.0 weight percent based on the weight of the whole layer composition.

The term polymethylated muconic acids suitable for use in preparing the polyester stabilizers disclosed herein also include the $C_1$ to $C_{20}$ hydrocarbyl monoesters of the acids wherein the hydrocarbyl group contains 1–20 carbon atoms as well as the hydrocarbyl diesters of the acids wherein each hydrocarbyl group contains 1–20 carbon atoms as well as any mixtures thereof.

The $C_1$–$C_{20}$ hydrocarbyl esters included for use in preparing the polyesters used in the present invention are selected from the hydrocarbyl radicals of $C_1$–$C_{20}$ hydrocarbons having acyclic, alicyclic, and aromatic structures such as those disclosed in the text "Handbook of Hydrocarbons," Ferris, S. W., Academic Press, Inc., New York, N.Y. (1955), pages 145–249, all of which are incorporated herein by reference. The preferred esters suitable for use in preparing the polyester additives usable in the composition of the present invention are the $C_1$–$C_{10}$ hydrocarbyl mono- and diesters of the polymethylated muconic acids disclosed above. Examples of the $C_1$–$C_{10}$ hydrocarbyl groups include methyl, ethyl, propyl, butyl, pentyl, hexyl, heptyl, octyl, nonyl, decyl cyclopentyl, methyl cyclopentyl, dicyclopentyl, cyclohexyl, phenyl, tolyl, xylyl, naphthyl, tetrahydronaphthyl, decahydronaphthyl, as well as the various isomers of each.

The diesters of the muconic acid can be a mixed ester. An illustrative example is the cis-cis isomer of $\alpha,\alpha'$-dimethylmuconic acid which can be illustrated by the following structural formula:

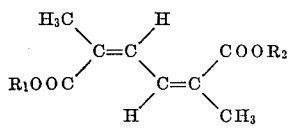

wherein $R_1$ is different from $R_2$. That is to say, $R_1$ can be a hydrocarbyl group of $C_1$–$C_{20}$ and $R_2$ can be a different hydrocarbyl group of $C_1$–$C_{20}$, e.g., $R_1$ equals cyclohexyl ($C_6$) and $R_2$ equals eicosyl ($C_{20}$).

Examples of some of the esters of the polymethylated muconic acids suitable for use in preparing the polyester additives usable in the compositions of the present invention include the cis-cis, cis-trans and trans-trans isomers of the mono- and di-methyl esters of $\alpha,\beta'$-dimethylmuconic acid; the mono- and di-phenyl esters of $\alpha,\alpha',\beta,\beta'$-tetramethylmuconic acid; the mono- and di-naphthyl esters of $\alpha,\beta,\beta'$-trimethylmuconic acid; the mono- and di-5,6-diethylacenaphthyl esters of $\alpha,\alpha'$-dimethylmuconic acid, the mono- and di-cyclohexyl ester of $\alpha,\alpha'$-dimethylmuconic acid; the mono- and di-1,2-dimethylcycloheptyl esters of $\alpha,\alpha',\beta,\beta'$-tetramethylmuconic acid; the mono- and di-1,3-dipropylbenzyl esters of $\alpha,\alpha'$-dimethylmuconic acid; the mono- and di-2,9-dimethyl-4,7-diisobutyldecyl esters of $\alpha,\alpha',\beta$-trimethylmuconic acid; and the mono- and dianthracyl esters of $\alpha,\beta'$-dimethylmuconic acid; mono- and di-2,6,10-trimethyl dodecyl esters of $\alpha,\alpha',\beta,\beta'$-tetramethylmuconic acid; and the nonyl ethyl esters of $\alpha,\alpha',\beta$-trimethylmuconic acid.

As noted above, polymethylated muconic acids can exist in three isomeric forms, viz. cis-cis, trans-trans and cis-trans. As an example, the unsaturated diacid, $\alpha,\alpha'$-dimethylmuconic acid, can be depicted by the following structural formulas:

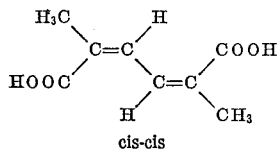
cis-cis

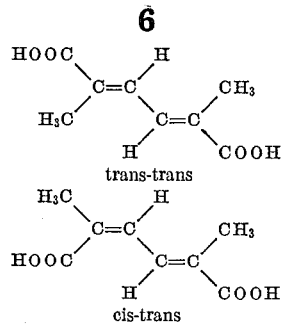

The preparation of each of these isomeric forms of the $\alpha,\alpha'$-dimethylmuconic acid has been described in the prior art by Elvidge et al., J. Chem. Soc., pages 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of polymethylated muconic acids can also be obtained by biological oxidation of p-xylene utilizing special strains of microorganisms as disclosed in United States application Ser. No. 509,621, filed Nov. 24, 1965, now U.S. Pat. No. 3,383,289, issued May 14, 1968.

Procedures for recovering esters of the three isomeric forms of methylated muconic acids usable in the compositions of the present invention are also disclosed in United States application Ser. No. 561,736, filed June 30, 1966, now U.S. Pat. No. 3,440,158 issued Apr. 28, 1969.

Polyethylene glycols suitable for use in preparing the polyester stabilizers of the present invention are generally represented by the structural formula:

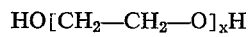

where $x$ equals any value in the range of 2 to 22. These polyethylene glycols are normally liquid at 25° C. and have a molecular weight in the range of 100 to 1000. Polyethylene glycols are well known standard articles of commerce. One method of preparing polyethylene glycols is disclosed in the text "Chemistry of Organic Compounds," Noller, Carl R., 2nd Edition, W. B. Saunders Co., Philadelphia, Pa. (1958), page 742. Methods for preparing the polyesters of the type herein disclosed are provided in U.S. Pat. No. 3,429,949 issued Feb. 25, 1969, to Gary L. Driscoll and Ser. No. 805,818 by Gary L. Driscoll filed of even date herewith.

In general, the polyesters suitable for use in the compositions of this invention can be defined as viscous liquids having a molecular weight in the range of 600 to 20,000 prepared by the copolymerization of the above-disclosed polymethylated muconic acids or their esters or mixtures thereof with polyethylene glycols having a molecular weight in the range of 100 to 1000.

As one means of illustrating the process and compositions of the present invention the following illustrations are presented. All parts and percentages given herein are by weight unless otherwise stated.

Example I

A viscous liquid polyester having a Brookfield viscosity of 1900 centipoises using a #4 spindle at 60 r.p.m. was prepared in the following manner:

(a) 500 grams of $\alpha,\alpha'$-dimethyl cis-cis muconic acid, 1320 grams of polyethylene glycol having a molecular weight average of about 300 and 5 cc. of tetraisopropyl titanate were blended with continuous agitation in a dry nitrogen purged glass polymerization vessel. The vessel was heated to a temperature of 200° C. and maintained thereat for 6 hours and with continuous nitrogen purge.

(b) The reaction product was vacuum distilled at 2 mm. Hg for 4 hours to remove water and untreated monomer.

(c) The distillation residue provided 1146 grams of a viscous polyester product.

Example II

A plasticized vinyl chloride polymer flexible surface covering composition was prepared by blending together the following components in a Banbury mixer at room temperature:

(a) 75 parts finely divided dry powder of a copolymer containing 97% vinyl chloride and 3% vinyl acetate and having a specific viscosity of 0.25.
(b) 10 parts dioctyl phthalate (plasticizer).
(c) 2 parts carnauba wax (release agent).
(d) 13 parts adipic acid polyester (plasticizer).

The blend was calendered onto the surface of an asbestos backing sheet and thereafter fused at 350° F. and 1000 p.s.i. for 10 to 20 seconds in a standard Carver molding press. A fused flexible thermoplastic surface covering sheet approximately .035 inch in thickness was recovered.

Example III

A flexible surface covering composition was prepared in accordance with the procedure disclosed above in Example II with the exception that 1.0 part of the viscous liquid polyester prepared as shown in Example I above was blended with the composition in the blending procedure.

Example IV

A flexible surface covering composition was prepared in accordance with the procedure disclosed above in Example II with the exception that 2.0 parts of the viscous liquid polyester prepared as shown in Example I were blended with the composition in the blending procedure.

Example V

A flexible surface covering composition was prepared in accordance with the procedures disclosed above in Example II with the exception that 3.0 parts of the viscous liquid polyester prepared as shown in Example I above were blended with the composition in the blending procedure.

Example VI

A flexible surface covering composition was prepared in accordance with the procedures disclosed above in Example II with the exception that 5.0 parts of the viscous liquid polyester prepared as shown in Example I above were blended with the composition in the blending procedure.

Example VII

A viscous liquid polyester having a Brookfield viscosity of 1670 centipoises using a #4 spindle at 60 r.p.m. was prepared in the following manner:

582 grams of dimethyl $\alpha,\alpha'$-dimethyl, trans-trans muconate, 1170 grams of polyethylene glycol having an average molecular weight of about 300 were blended and heated in a glass polymerization vessel under a nitrogen atmosphere until the entire blend was molten. The melt was thereafter maintained at 200° C. while 4.0 cc. of tetraisopropyl titanate catalyst was added. Thereafter, the blend was maintained at 200° C. for 12 hours under continuous agitation. The resultant liquid product was vacuum distilled at 1 mm. Hg pressure for 3 hours. The residue recovered comprised 1500 grams of a thick viscous polyester liquid.

Example VIII

A flexible surface covering composition in accordance with the procedure disclosed above in Example II with the exception that 8.0 parts of the viscous liquid polyester prepared as shown in Example VII above was blended with the composition in the blending precedure.

Example IX

A flexible surface covering composition in accordance with the procedure disclosed above in Example II with the exception that 10.0 parts of the viscous liquid polyester prepared as shown in Example VII above was blended with the composition in the blending procedure.

Example X

A flexible surface covering composition in accordance with the procedure disclosed above in Example II with the exception that 12.0 parts of the viscous liquid polyester prepared as shown in Example VII above was blended with the composition in the blending procedure.

Example XI

A flexible surface covering composition in accordance with the procedure disclosed above in Example II with the exception that 15.0 parts of the viscous liquid polyester prepared as shown in Example VII above was blended with the composition in the blending procedure.

Example XII

A flexible surface covering composition in accordance with the procedure disclosed above in Example II with the exception that 20.0 parts of the viscous liquid polyester prepared as shown in Example VII above was blended with the composition in the blending procedure.

Each of the sheet compositions prepared in accordance with the procedures disclosed above was separated from the backing sheet and cut into 4 inch squares which were thereafter subject to natural sunlight occurring in the southern part of continental United States for a total exposure time of 300 hours. Each sample was evaluated for intensity of yellowness before exposure to sunlight, after 300 hours of exposure to sunlight and at 50 hour intervals therebetween.

The evaluation of each sample was based on the intensity of yellowness in that sample which was apparent to the human eye. In accordance with the rating system the numeral 1 indicates a substantially white or clear sheet with little or no yellowness observed. A rating of 2 indicates slight yellowing and a rating of 5 indicates intense yellowing with numerals 3 and 4 indicating increased yellowness respectively. Thus, in accordance with the present rating system, the lower the numeral the more ultraviolet stable the composition appeared.

Example II serves as a control since it includes no added ultraviolet stabilizer. Examples III to VI and VIII through XII represent compositions prepared in accordance with the present invention. The results of the evaluation are presented in the table given below.

| | Parts U.V. stabilizer added | Hours of exposure to sunlight | | | | | | |
|---|---|---|---|---|---|---|---|---|
| | | 0 | 50 | 100 | 150 | 200 | 250 | 300 |
| | | Yellowness intensity rating | | | | | | |
| Example II | 0 | 1 | 3 | 3 | 4 | 5 | 5 | 5 |
| Example III | 1.0 | 1 | 2 | 2 | 3 | 3 | 3 | 4 |
| Example IV | 2.0 | 1 | 1 | 2 | 2 | 3 | 3 | 3 |
| Example V | 3.0 | 1 | 1 | 2 | 2 | 2 | 3 | 3 |
| Example VI | 5.0 | 1 | 1 | 1 | 1 | 2 | 3 | 3 |
| Example VIII | 8.0 | 1 | 1 | 1 | 1 | 2 | 2 | 3 |
| Example IX | 10.0 | 1 | 1 | 1 | 1 | 1 | 2 | 2 |
| Example X | 12.0 | 1 | 1 | 1 | 1 | 1 | 2 | 2 |
| Example XI | 15.0 | 1 | 1 | 1 | 1 | 1 | 1 | 2 |
| Example XII | 20.0 | 1 | 1 | 1 | 1 | 1 | 1 | 1 |

As is clearly shown by the data given in the table, the liquid polyesters of the type hereinabove disclosed when incorporated into a plasticized vinyl chloride polymer composition provides a composition having substantially improved ultraviolet stability.

As an added advantage, the ultraviolet stability improving liquid polyesters disclosed herein can also function as plasticizers in the vinyl chloride polymer compositions thereby providing an ultraviolet stability improving liquid plasticizer suitable for use in solid vinyl chloride polymer compositions.

The flexible surface covering compositions of the present invention can also include other additives such as fillers including wood flour, clays and chalk, pigments, other light and heat stabilizers as well as the many other additives normally used in flexible surface covering compositions.

Other methods and compositions suitable for preparing flexible surface covering compositions which utilize plasticized vinyl chloride polymers and copolymers as the principal binder in the composition are disclosed in United States patents: Biskup, Pat. No. 3,121,642 dated Feb. 18, 1964; Kupits, Pat. No. 3,129,194 dated Apr. 14, 1964; Palmer, Pat. No. 3,224,894 dated Dec. 21, 1965; Kupits, Pat. No. 3,232,780 dated Feb. 1, 1966; Carlisle et al., Pat. No. 3,239,364 dated Mar. 8, 1966; and Daneski et al., Pat. No. 3,343,975 dated Sept. 26, 1967, the disclosure of each being herewith incorporated by reference.

The invention claimed is:

1. A vinyl chloride polymer composition comprising a solid vinyl chloride polymer, and an ultraviolet stability improving quantity of a polyester of a polymethylated muconic acid selected from the group consisting of $\alpha,\alpha'$-dimethylmuconic acid, $\alpha,\beta'$-dimethylmuconic acid, $\alpha,\alpha'\beta$-trimethylmuconic acid, $\alpha,\beta,\beta'$-trimethylmuconic acid, $\alpha,\alpha',\beta,\beta'$-tetramethylmuconic acid and mixtures thereof with a polyethylene glycol having a molecular weight in the range of 100 to 1000 said polyester having a molecular weight in the range of 600 to 20,000.

2. A composition according to claim 1 wherein the vinyl chloride polymer is a copolymer containing 90–97 weight percent polymerized vinyl chloride and 3–10 weight percent polymerized vinyl acetate.

3. A composition according to claim 1 wherein the ultraviolet stability improving polyester is derived from the cis-cis isomer of said polymethylated muconic acids.

4. A composition according to claim 3 wherein the quantity of ultraviolet stability improving material is in the range of 2 to 10 weight percent.

5. A composition according to claim 4 wherein said polymethylated muconic acid is $\alpha,\alpha'$-dimethylmuconic acid.

6. A composition according to claim 5 wherein the vinyl chloride polymer is a copolymer containing 90–97 weight percent polymerized vinyl chloride and 3–10 weight percent polymerized vinyl acetate.

7. A composition according to claim 1 wherein the ultraviolet stability improving polyester is derived from the cis-trans isomer of said polymethylated muconic acids.

8. A composition according to claim 7 wherein the quantity of ultraviolet stability improving material is in the range of 2–10 weight percent.

9. A composition according to claim 8 wherein said polymethylated muconic acid is $\alpha,\alpha'$-dimethylmuconic acid.

10. A composition according to claim 9 wherein the vinyl chloride polymer is a copolymer containing 90–97 weight percent polymerized vinyl chloride and 3–10 weight percent polymerized vinyl acetate.

11. A composition according to claim 1 wherein the ultraviolet stability improving polyester is derived from the trans-trans isomer of said polymethylated muconic acids.

12. A composition according to claim 11 wherein the quantity of ultraviolet stability improving material is in the range of 2–10 weight percent.

13. A composition according claim 12 wherein said polymethylated muconic acid is a $\alpha,\alpha'$-dimethylmuconic acid.

14. A composition according to claim 13 wherein the vinyl chloride polymer is a copolymer containing 90–97 weight percent polymerized vinyl chloride and 3–10 weight percent polymerized vinyl acetate.

References Cited

UNITED STATES PATENTS 3,256,312   6/1966   Strobel _____ 260—45.85

M. J. WELSH, Primary Examiner

V. P. HOKE, Assistant Examiner

U.S. Cl. X.R.

117—161; 260—31.8, 873